United States Patent [19]
Pryor et al.

[11] 3,785,737
[45] Jan. 15, 1974

[54] SEPARATION MEASUREMENT METHOD AND DEVICES EMPLOYING DIFFRACTION WAVES

[76] Inventors: Timothy R. Pryor, 5423 York Ln., Bethesda, Md. 20014; Omer L. Hageniers, 357 Rosedale Ave., Windsor, Ontario, Canada

[22] Filed: May 30, 1972

[21] Appl. No.: 257,801

[52] U.S. Cl. ............................ 356/111, 350/162 R
[51] Int. Cl. ............................................ G01b 9/02
[58] Field of Search .............. 356/106–113; 350/162

[56] References Cited
UNITED STATES PATENTS
3,518,007   6/1970   Ito............................................ 356/159

Primary Examiner—David Schonberg
Assistant Examiner—Conrad Clark
Attorney—Roberts B. Larson et al.

[57] ABSTRACT

A method is disclosed for measuring the separation between a surface and a member. The member includes diffraction wave producing means such as an object boundary. Incident electromagnetic waves are directed at the diffraction wave producing means before and after reflection from the surface and an interference pattern is produced. Analysis of this interference pattern gives the separation.

14 Claims, 3 Drawing Figures

SEPARATION MEASUREMENT METHOD AND DEVICES EMPLOYING DIFFRACTION WAVES

BACKGROUND OF THE INVENTION

This invention relates to subject matter disclosed in U.S. Pat. No. 3,664,739 and to co-pending applications Ser. No. 253,421, filed May 15, 1972 and Ser. No. 256,099, filed May 23, 1972, by Timothy R. Pryor, which are herein incorporated by reference.

The quality and flatness of surfaces is presently checked where possible using an interferometer flat and suitable optical system. Using this technique, deviations in surfaces of small fractions of a wavelength of light can be determined. When surface dimension exceeds approximately 10 cm however, the cost of the necessary reference flat increases rapidly, and becomes prohibitive for most applications. In addition, when the surface is not sufficiently reflective to normally incident light, interferometry cannot be used at all. In such cases, it becomes necessary to use autocollimator or other techniques to define an accurate straight line between two points on the surface, taking readings between a large number of sets of points. In other words, when present interferometric techniques become impractical, high quality surface measurement becomes difficult indeed.

In stress analysis, research, and nondestructive testing, it is often of interest to study the minute deflections of a member surface under applied load, be it thermal, mechanical or whatever. Holographic techniques have been much in vogue of late and can achieve the very high resolution of displacement required, though at a considerable cost in both time and money. In addition, holography cannot in general deal with many of the larger displacements found in practice, its range being limited practically to 0.025 mm, approximately.

Another problem in practice is the determination of straightness and quality of object boundaries, such as razor blade edges, roller bearing surfaces and the like. No suitable technique has existed heretofore for this purpose capable of easily determining these quantities in a highly accurate manner.

Accordingly, it is an object of the invention to provide a highly accurate, easily usable method for determining the separation between an object and a surface, such that if the position of one is known, the position of the other may be determined.

It is a further object of the invention to provide a means for producing a visually interpretable pattern whose intensity distribution indicates the separation of a plurality of positions along a line.

It is a still further object of the invention to provide means for very accurately sensing small displacements of a member relative to a surface in a quasi-digital manner.

BRIEF SUMMARY OF THE INVENTION

The foregoing and other objects which will be apparent to those of ordinary skill in the art are achieved according to the invention by providing a method for the determination of the separation of a surface and a member including diffraction wave producing means comprising the steps of, directing electromagnetic radiation onto said diffraction wave producing means of the member to form a first diffraction wave, directing electromagnetic radiation onto the surface in such a manner that incident electromagnetic radiation is reflected from the surface onto the diffraction wave producing means of the member, to form a second diffraction wave, the first and second diffraction waves interacting to form an interference pattern, and determining from the interference pattern, the separation between the member and the surface. Suitable apparatus for the method comprises means for directing electromagnetic radiation onto the diffraction wave producing means of the member to form a first diffraction wave, means for directing electromagnetic radiation onto the surface in such a manner that incident electromagnetic radiation is reflected from the surface onto the diffraction wave producing means of the member, to form a second diffraction wave, the first and second diffraction waves interacting to form an interference pattern, and means for detecting a portion of the interference pattern for determining the separation between the member and the surface.

DETAILED DESCRIPTION

There follows a detailed description of a preferred embodiment of the invention, together with accompanying drawings. However, it is to be understood that the detailed description and accompanying drawings are provided solely for the purpose of illustrating a preferred embodiment and that the invention is capable of numerous modifications and variations apparent to those skilled in the art without departing from the spirit and scope of the invention.

While practicing the inventions described in the co-pending applications described above a method was sought by which object reference boundaries could themselves be checked. This invention is the result, and it is capable not only of checking the quality of straight edges and the like, but also of determining the contour or deformation of surfaces. In addition, the concepts herein may be used with virtually all detection systems discussed in the above referenced patent applications, allowing similar construction of practical measurement and transducer devices having outstanding accuracy, range and stability, together with quasi-digital outputs, if desired.

The invention functions in essence by using waves diffracted by a diffraction wave producing means to interfere with waves diffracted by the same diffraction wave producing means after an initial reflection from a surface. A typical example results when an edge or other boundary of an object acts as the diffraction wave producing means, the diffracted waves emanating effectively from the edge when waves are incident thereon. In a recently published scientific paper, "Diffractographic Dimensional Measurement", herein incorporated by reference, we have called this the "Bounce-off Diffractographic" method (Applied Optics, Feb. 1972). Other examples of diffraction wave producing means are discussed below, and in the above referenced patent and applications.

Figure 1:
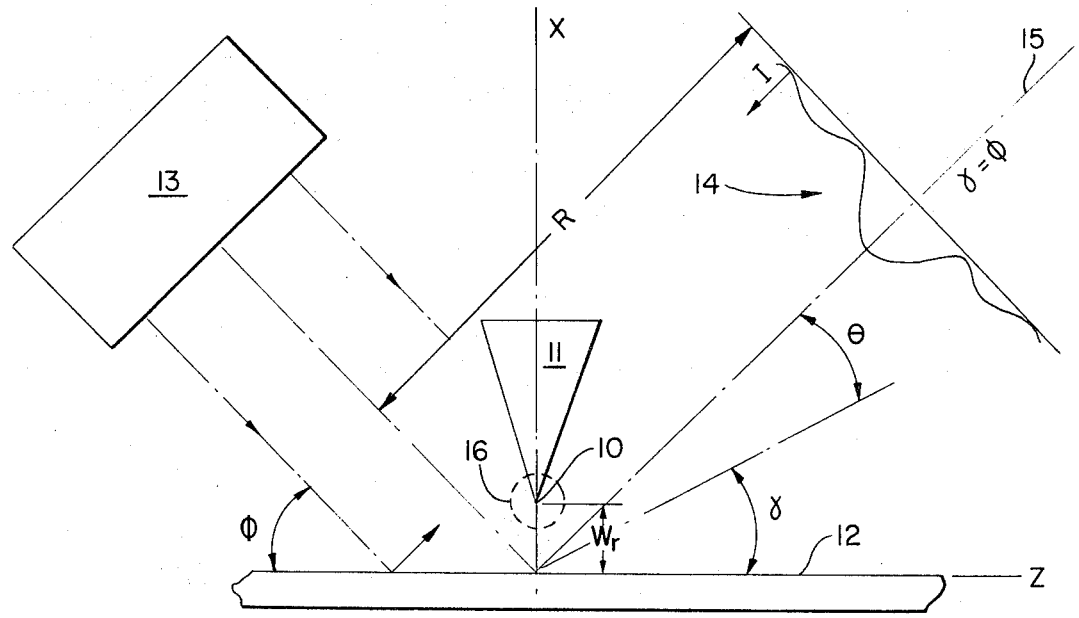
FIG. 1 is a diagrammatic side elevation view of an embodiment of the invention.

In the embodiment of the invention shown in FIG. 1, an edge boundary 10 of member 11 is adjacent and locally parallel to surface 12. Surface 12 is substantially flat and is reflective to the wavelength λ of monochromatic, spatially coherent electro-magnetic radiation from laser wavesource 13 incident on both edge and surface. For angles of incidence $\phi$ greater than roughly 15°, the Fraunhofer type interference pattern 14 produced at a distance R much greater than the surface-edge separation $w_r$ is effectively identical in the region near the axis of reflected radiation to that produced by a slit of width $2w_r$ illuminated at an angle $\phi$ to its normal. The term "interference pattern" has been chosen rather than "diffraction pattern" to coincide with the terminology of the above-identified applications and to more definitively describe the phenomena involved.

The criterion R>>w need not be invoked if a lens is used to form the pattern. The intensity distribution of the pattern is, in view of the similarity of the present pattern to that produced by a slit, proportional to $\sin^2\beta/\beta^2$ where, $$\beta = 2w_r (\pi/\lambda) (\sin \gamma + \sin\phi) \quad (1)$$

and the resulting fringe minima lie whereever $\beta = \pm\pi$, $\pm 2\pi, \pm 3\pi$ etc. For $\phi$ fixed, the separation $w_r$ may be determined by measuring the angle $\gamma$ from a line parallel to the surface in plane of the diagram at which one or more of the fringes lies.

When the fringes lie at small angles $\theta$ away from the axis 15 located at $\gamma = \phi$, a trigonometric approximation may be made allowing the use of the following approximate relation for the condition when fringe minima are located at angles $\theta$;

$$w \sin\theta = n \lambda \quad (2)$$

where w equals $2w_r \cos \phi$. Relation (2) is the same as relations (3) of the above-identified patent applications, and for this reason all means for interpreting such interference patterns to give w or changes in w discussed therein may be used. As mentioned in the referenced applications, analysis of the interference pattern allows w to be resolved to under 0.2 microns using the naked eye, and to less than 0.01 microns using photoelectric detection. Furthermore, the means by which the interference pattern is generated and readout may be extremely stable and quasi-digital readout means may be provided which provide a number of counts proportional to the change in w, and thence $w_r$.

As is apparent, changes in $w_r$ are twice magnified as changes in w, and thus this bounce-off version is twice as sensitive as the transmission type described in the referenced applications. This double sensitivity can be of importance in construction of high resolution displacement transducers.

As shown in FIG. 1, the invention constitutes the most accurate practical means of checking straight profiles known to us, since the surface acting as the reference for the tested edge or other object boundary can be an interferometer flat of flatness deviation less than 1/100 λ. In this case, all changes in the interference pattern as different y locations along the edge are illuminated may be considered due to the object edge, and the resulting changes in $w_r$ are determinable by analysis of the pattern with great accuracy (in fact, near the accuracy of the flat itself). The technique is especially useful when done along a whole length of boundary as in the case shown in FIG. 2.

Where the object is a cylindrical roller bearing or other member whose boundary has much less curvature than the wedged edge boundary 10 shown in FIG. 1, smaller angles $\phi$ are required if the waves are all to be diffracted from essentially the same position on the boundary. This criterion is not necessary for the function of the invention, but simplifies analysis of the pattern and the information derived therefrom.

When angles $\phi$ less than 15° (approximately) are used in apparatus arranged as in FIG. 1, we found that a new type of fringe pattern begins to be noticeable (though the effect is present for all angles $\phi$). We call them "crossed fringes" and their origin is phenomenologically explained in our above referenced paper on "Diffractographic Dimensional Measurement". They are manifested as fringes spaced in the y direction and perpendicular to the surface. At any given y location, a crossed fringe minima occurs when the value of $w_r$ at the location is such that $$2w_r \sin\phi = n \lambda \quad (3)$$

Figure 2:
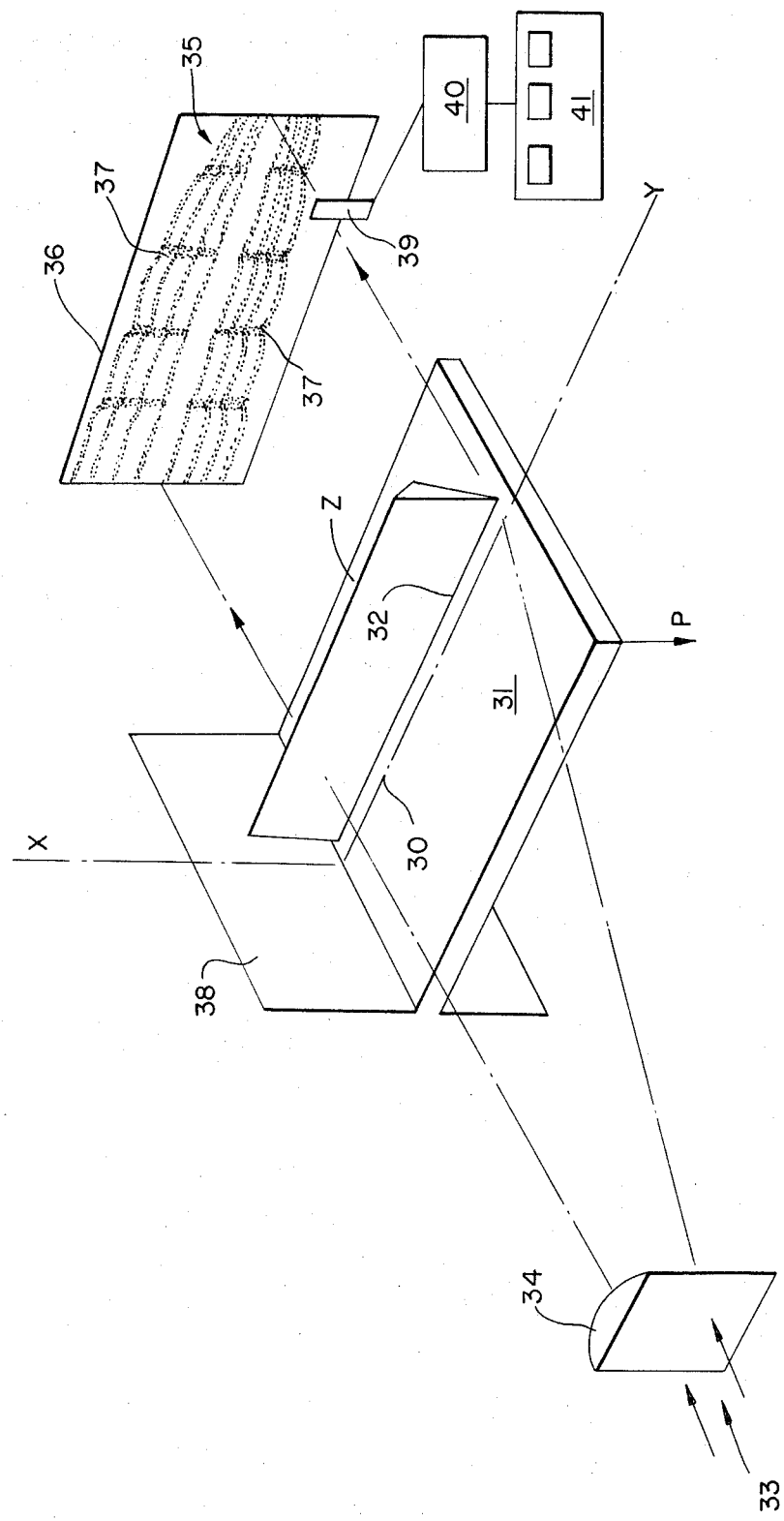
FIG. 2 is a diagrammatic perspective view of an alternative embodiment of the invention utilized to produce a visually interpretable pattern proportional to the deflection of a member along a line.

Such a crossed fringe case is illustrated and further described in relation to FIG. 2.

As mentioned previously, other types of diffraction wave producing means may also be used. Consider for example the replacement of member 11 in FIG. 1 with small cylindrical object 16, shown in dotted lines. In this case, two object boundaries are presented to the incoming and reflected wavefronts and the interference pattern 14 becomes modified by an envelope proportional to the individual object width, and has fringe maxima of four times the intensity of the pattern resulting from use of member 11.

While of less general utility than the single boundary case, such an arrangement may be used to check the straightness of wires, strips and other such members with two parallel or nearly parallel boundaries. In addition, a flat surface may be checked against a tensioned wire reference in a manner analagous to FIG. 2 below.

Shown in FIG. 2 is an embodiment for determining the deflection of all points along a line 30 of a corner loaded cantilever plate 31 utilizing the invention to determine separation between a fixed reference straight edge 32 and the surface of the plate. In a manner analagous to that described in the above referenced applications, an incident He-Ne gas laser beam 33, of wavelength 6328A, is fanned by cylinder lens 34 along the whole length of plate desired, producing a Fraunhofer type profile interference pattern 35 on screen 36.

Since the plate surface is in this example surface ground steel, it is necessary to use a grazing incidence angle $\phi$ of a few degrees to obtain a satisfactory reflection at the visible wavelength used. Thus the crossed fringes 37 mentioned above are very much in evidence, with spacing between any two such fringes proportional to the local rate of change in $w_r$, that is to the slope of the deflected plate. The crossed fringes can themselves therefore be used to measure profile changes, and if easily visible crossed fringes characteristic of small angles $\phi$ are present, this represents a generally more accurate way than using the ordinary interference fringes, which are themselves modified by the crossed fringes. If one does choose to use the ordinary fringes in this case, it is much preferred that only the central maximum region be used, as this is least affected by the crossed fringe phenomena.

The crossed fringe information can further be interpreted in a manner similar to photoelastic or holographic fringes by locating a nodal position which undergoes no deflection (such as the position $y = 0$ where the cantilever plate of FIG. 2 joins the wall 38) and counting the number $q$ of crossed fringes between the $y$ position in question and the nodal position. Using equation (3) therefore, the deflection of the observed location on the plate relative to the nodal or zero location (or any other chosen location) is $$\delta_x = w_r - \overline{w}_{r_0} = q\lambda/2\sin\phi \tag{4}$$

where $q$ equals the difference in crossed fringe order numbers $n$. This allows rapid and accurate determination of profiles without measuring fringe spacings or angular locations.

The same equation (4) results if $\overline{w}_{r_0}$ is considered to be some initial spacing between a diffraction wave producing means and a final $w_r$ position, perhaps indicative of displacement of an elastic member due to a variable such as force, pressure etc. Since equation (4) is of the same form as those equations for count sensitivity $\overline{N}_{\theta_d}$ of a quasi-digital photoelectric detection system given in the above-referenced patent applications, a similar detection scheme may be used with the crossed fringes.

Consider photodetector 39 connected to amplifier 40 and feeding counter 41 in FIG. 2. The photodetector is arranged to detect a narrow range of $y$ values, but extends over a sufficient distance in the $x$ direction to avoid undue fluctuations in detected intensity as the ordinary fringes move on and off the detector face in the $x$ direction, with changes in $w_r$. From equation (4), this detector will produce one full crossed fringe count every time $w_r$ changes by $\lambda/2\sin\phi$, and a quasi-digital displacement sensor results. Similar to methods discussed in the above-referenced applications, two detectors may be used to produce output signals in phase quadrature if each is located in a pattern produced using the same $\phi$ values but different initial separations $\overline{w}_{r_0}$. In this manner, both detectors see the same number of crossed fringes for any change in $w_r$, though their output signals are 90° out of phase.

The quasi-digital crossed fringe count producing detection system described above has two advantages over those of the above-referenced applications. First, fringe spacing is the same for all values $w_r$ and can be quite large. This means that a detector of considerable width in the $y$ direction can be used if, unlike FIG. 2, the boundary and surface are virtually parallel, as would be the case in self-contained uniaxial displacement transducers. In addition to the increased intensity detected in the $y$ direction, the detector also extends over a considerable distance in the $x$ direction as well, and thus a large percentage of all radiation in the total interference pattern is utilized by the detection system. Fringe contrast however, is not as high and decreases as $w_r$ increases, essentially negating this advantage.

Figure 3:
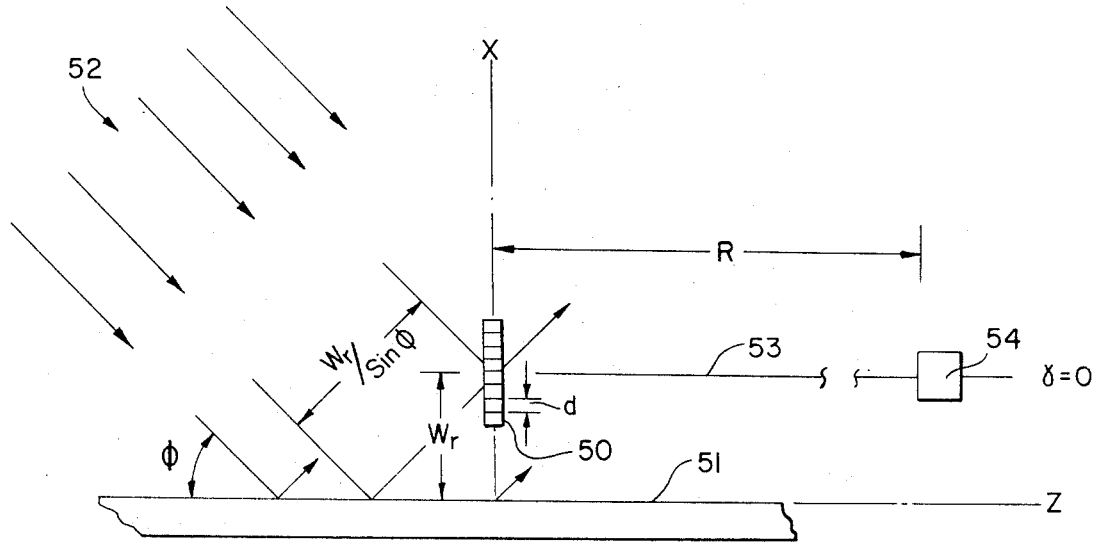
FIG. 3 is a diagrammatic side elevation of a further embodiment of the invention employing a diffraction grating and providing a quasi-digital output.

The characteristics just described are similar in some respects to those exhibited by a classical fringe counting interferometer. Thus, the crossed fringed version of the invention in this fringe counting form can be considered an interferometer of sorts, possessing higher mechanical stability and of detuned sensitivity. Another embodiment of the invention is shown in FIG. 3.

There are several additional considerations of interest. First, the surface has been assumed nearly flat in the region of the boundary in order to obtain the above equations. Fresnel type diffraction effects are observed when appreciable surface curvature is present in the $z$ direction and this complicates analysis. The surface has been further assumed highly reflecting, and this is satisfied for some surfaces only at grazing angles, i.e. very small values of $\phi$. When such angles are used, crossed fringes invariably result and the zone of reflection from the surface in the $z$ direction becomes much longer than separation $w_r$. To obtain simple analysis therefore, all points in this zone must be effectively on a straight line in the $z$ direction — that is, the surface must be locally flat in the $z$ direction over the reflecting region.

The uses of "bounce-off" diffractography are several. In the FIG. 2 example, a very simple and highly accurate means of checking surface flatness results. This is particularly useful where large surfaces are encountered, such as surface tables, machine ways and the like. In these cases, the commonly used interferometer flat technique cannot be used and it is considered that the disclosed invention constitutes the most accurate technique available. Obviously, it is essential that the straight reference edge positions be known, and for very large surfaces this implies considerable sophistication in the construction of such edge members, or in some cases the use of a tensioned wire as mentioned above.

In a similar manner, surfaces which have an arbitrary though nearly flat curvature can be contoured as well, using a straight edge reference. Since measurement can be accomplished at very high speeds, surface contours of moving material can be done "on-the-fly" as well, as discussed in the referenced patent applications. Where curvature becomes too great, a point by point analysis may often be made by using a contoured reference edge and scanning an incident laser beam down the nearly parallel aperture so formed, noting that the surface now need only be nearly flat in the local region illuminated.

Where the diffraction wave producing means and the surface are divergent more than a few degrees from parallel over a local region, it is necessary to employ the cylinder lens technique described in the above-referenced applications whereby a cylinder lens causes diffracted waves to rapidly diverge in the $y$ direction from a very small focal line region on the diffraction wave producing means. Such techniques may also be used to produce microprofiles of small regions as well.

Another consideration is that a liquid may form the surface. Thus, small undulations in the surface of liquids may be studied using the invention, or liquids may serve as references either because they are flat in a non-excited state or because their plane is always perpendicular to the earth's gravitational field.

As mentioned above, when ordinary non-polished surfaces are used (steel, cement, etc) grazing incidence is required to obtain suitable reflectance, at least when visible electromagnetic waves are used. While most useful, such visible waves are not at all required by the technique and when infra-red waves are used, much better reflection results from such surfaces, thereby producing better quality diffraction patterns and/or negating the grazing incidence requirement.

For checking boundary profiles versus a flat mirror an advantage of the invention relative to that disclosed in the above-referenced applications, is that no line up is required of two edges (the test boundary and a reference boundary) in the same plane, usually itself perpendicular to the laser beam propagation direction.

Illustrated in FIG. 3 is an embodiment of the invention employing a diffraction grating diffraction wave producing means 50 positioned a distance $w_r$ from flat mirror surface 51, and illuminated by plane waves 52. By choosing the period of the grating to be such that a grating order is produced in the direction of the grating normal 53, a simple fringe counting type displacement transducer of extreme sensitivity results.

Considering the operation of the device in more detail, waves directly incident at an angle $\phi$ on the grating are diffracted in a fan of grating orders, spaced about the grating normal 53, whose position angle $\gamma$ from said normal is given by the equation $$d(\sin\phi + \sin\gamma) = m\lambda \tag{5}$$

where $d$ is the grating period, and m is the grating order number. Similarly, incident waves reflected from the surface strike the grating at the same incidence angle $\phi$, measured in the opposite sense relative to the grating normal. However, since $\gamma$ must also be measured in the opposite sense when applying equation (5) to this case, the grating orders produced by both direct and reflected waves incident on the grating will occur at the same spatial locations, though out of phase by $w_r/\lambda\sin\phi$ wavelengths (plus a constant phase factor gained on reflection from the surface).

Because of the considerations above, a detector placed at any grating order location will see an oscillating intensity proportional to the separation $w_r$, with a new fringe count occurring everytime $$\delta_x = w_r - w_r = \lambda\sin\phi \tag{6}$$

This equation indicates that for values of $\sin\phi$ less than one half, the device is more sensitive than a conventional fringe counting interferometer. Range is, however, more limited due to the large incident beam width and mirror length required for large values of $w_r$, when $\phi$ is small. Note that the device is insensitive to grating movements in a plane parallel to the surface.

The grating period and $\phi$ may be chosen such that the grating order $m$ desired lies at $\gamma = 0$, parallel to the surface. This is a preferred embodiment, since unlike any other arrangement, this does not require that one of the two interfering grating orders be itself refleted from the surface. Some reflection of course may occur at small $w_r$ values, since the grating order has a small angular spread, but this is not required since the same angular spread of the orders allows the unreflected portions to interfere. Crossed fringes may also be formed in this case. A detector 54 is shown in FIG. 3 located at this preferred position.

Where grazing angles $\phi$ are used, extremely high sensitivity results from a small simple and rugged package.

What is claimed is:

1. A method for determining the separation of a surface and a member including diffraction wave producing means comprising the steps of:
   directing electromagnetic radiation onto said diffraction wave producing means of said member to form a first diffraction wave;
   directing electromagnetic radiation onto said surface in such a manner that incident electromagnetic radiation is reflected from said surface onto said diffraction wave producing means of said member, to form a second diffraction wave, said first and second diffraction waves interacting to form an interference pattern; and
   determining from said interference pattern, the separation between said member and said surface.

2. A method according to claim 1 wherein electromagnetic radiation is subsequently directed onto said diffraction wave producing means and onto said surface to form a further interference pattern at a later time and wherein at least a portion of said further interference pattern is compared with at least a portion of the earlier produced interference pattern to determine changes in the separation of said member and said surface.

3. A method according to claim 2 including the step of detecting a portion of an interference pattern at a spatial position fixed with respect to said diffraction wave producing means or said surface whereby any change in an interference pattern caused by changes in separation of said member and said surface is indicated by the detection of interference pattern fringes moving relative to said spacially fixed detecting position.

4. A method according to claim 1 wherein said diffraction wave producing means comprises an object boundary.

5. A method according to claim 1 wherein said electromagnetic radiation is simultaneously directed onto a plurality of points along said surface.

6. Apparatus for determining the separtion of a surface of a member including diffraction wave producing means comprising:
   means for directing electromagnetic radiation onto said diffraction wave producing means of said member to form a first diffraction wave;
   means for directing electromagnetic radiation onto said surface in such a manner that incident electromagnetic radiation is reflected from said surface onto said diffraction wave producing means of said member, to form a second diffraction wave, said first and second diffraction waves interacting to form an interference pattern; and
   means for detecting a portion of said interference pattern for determining the separation between said member and said surface.

7. Apparatus according to claim 6 including detection means located at a spatial position fixed with respect to said diffraction wave producing means or said surface whereby any change in an interference pattern caused by changes in separation of said member and said surface is indicated by the detection of interference pattern fringes moving relative to said spacially fixed detection means.

8. Apparatus according to claim 6 wherein said diffraction wave producing means comprises an object boundary.

9. Apparatus according to claim 6 wherein said member including said diffraction wave producing means is elongate, an elongate gap being formed between said member and said surface, and wherein said electromagnetic radiation is simultaneously directed onto a plurality of points along said elongate gap.

10. A method according to claim 1 wherein said diffraction wave producing means comprises an object having two boundaries.

11. A method according to claim 1 wherein said diffraction wave producing means comprises a diffraction grating.

12. Apparatus according to claim 6 wherein said diffraction wave producing means comprises an object having two boundaries.

13. Apparatus according to claim 6 wherein said diffraction wave producing means comprises a diffraction grating.

14. A method according to claim 1 wherein said surface is moving.

* * * * *